United States Patent [19]

Fukazawa et al.

[11] Patent Number: 5,376,941
[45] Date of Patent: Dec. 27, 1994

[54] ANTENNA DIRECTION ADJUSTING METHOD AND APPARATUS FOR SATELLITE BROADCASTING RECEIVING SYSTEM

[75] Inventors: Takekazu Fukazawa, Yachiyo; Masataka Noda, Chiba, both of Japan

[73] Assignee: Uniden Corporation, Chiba, Japan

[21] Appl. No.: 47,677

[22] Filed: Apr. 15, 1993

[30] Foreign Application Priority Data

Oct. 30, 1992 [JP] Japan .................................. 4-292343

[51] Int. Cl.$^5$ .......................... H01Q 3/00; G01S 13/00
[52] U.S. Cl. ........................................ 342/359; 342/75
[58] Field of Search ............................. 342/359, 74, 75

[56] References Cited

U.S. PATENT DOCUMENTS

| | | | |
|---|---|---|---|
| 4,796,032 | 1/1989 | Sakurai et al. | 342/359 |
| 4,801,940 | 1/1989 | Ma et al. | 342/359 |
| 4,935,814 | 6/1990 | Omoto et al. | 348/193 |

FOREIGN PATENT DOCUMENTS 62-69737  3/1987  Japan .

*Primary Examiner*—Gregory C. Issing
*Attorney, Agent, or Firm*—Ratner & Prestia

[57] ABSTRACT

A method and an apparatus for adjusting the direction of an antenna on the basis of the C/N in a satellite broadcasting receiving system are disclosed. When the image quality is insufficient with the antenna direction in a displaying mode, a user specifies a fine adjustment mode through a key input portion. Then the current antenna direction is stored into a memory as a fine adjustment start position. A CPU deflects the antenna within a predetermined measuring range around the fine adjustment start position. The CPU detects one or more peaks of the C/N level and discriminates non-objective peaks. If the C/N level exhibits a plurality of peaks resulting from the signal reception, the CPU selects the antenna direction corresponding to the peak closest to the fine adjustment start position.

4 Claims, 4 Drawing Sheets

ANTENNA DIRECTION ADJUSTING METHOD AND APPARATUS FOR SATELLITE BROADCASTING RECEIVING SYSTEM

BACKGROUND OF THE INVENTION

1. Field of the Invention

The present invention relates generally to a method and an apparatus for adjusting the direction of an antenna in a system receiving satellite broadcasting waves directly from a satellite, and more particularly to a method and an apparatus for automatically adjusting the antenna direction to receive images with an optimum quality.

2. Description of the Prior Art

In order to automatically adjust the direction of an antenna for received images with an optimum quality in a system receiving broadcasting waves directly from a satellite, a method is known in the prior art by which the level of an automatic gain control (AGC) voltage for a received signal is measured and the antenna is steered so as to maximize the level of the AGC voltage. This type of method is disclosed, for instance, in Japanese Patent Laid-open No. 62-69737 entitled "Satellite Broadcasting Receiving System".

According to the conventional technique, the magnitude of an input signal is detected in terms of an AGC voltage and an antenna is steered in the direction where the maximum magnitude of an input signal is obtained. However, the AGC voltage is affected by the signal losses within cables interconnecting an outdoor unit and an indoor unit and the noises amplified excessively by an amplifier inserted to compensate losses. On the other hand, the quality of an image (S/N) is not necessarily proportional to the magnitude of the input signal but to the C/N (Carrier to Noise Ratio) of the input signal. That is, in the case of stronger noise components in the signal (a smaller C/N), the image quality becomes degraded even if the magnitude of the input signal is large, and on the contrary, in the case of weaker noise components in the signal (a larger C/N), the image quality becomes satisfactory even if the magnitude of the input signal is small.

Therefore, although the use of the AGC voltage for the detection of the input signal magnitude is effective, there is the possibility that images of an optimum quality may not be received by the automatic adjustment of an antenna direction using the AGC voltage since the image quality is not necessarily proportional to the magnitude of the input signal as described above.

Moreover, according to the conventional technique, when the antenna direction to receive the wave from another satellite adjoining an objective satellite exists in the range for the measurement of the AGC voltages and the signal received from the adjoining satellite is stronger than the one from the objective satellite, the antenna may be erroneously steered toward the adjoining satellite, since the direction of the antenna is controlled so as to maximize the level of the AGC voltage.

SUMMARY OF THE INVENTION

It is an object of the present invention to provide a method and an apparatus for adjusting the direction of an antenna in a satellite broadcasting receiving system, from which the problems mentioned above are eliminated.

The present invention provides an antenna direction adjusting method for adjusting the direction of a parabolic antenna to provide images of an optimum quality in a system receiving satellite broadcasting waves directly, characterized by adjusting the direction of the antenna on the basis of the level of a carrier-to-noise ratio (C/N).

The present invention also provides an antenna direction adjusting apparatus for a system receiving satellite broadcasting waves directly, characterized by the provision of a filter for detecting a noise component from the signal received by an antenna, a noise detector for converting the detected noise component into a DC voltage, a DC amplifier for amplifying the DC voltage, an A/D converter for converting the amplified DC voltage into a digital signal indicative of the carrier-to-noise ratio (C/N), and a control device for adjusting the antenna direction on the basis of the C/N level.

Furthermore, according to the present invention, the antenna is deflected, in a fine adjustment mode, over a predetermined fine adjustment measuring range around a fine adjustment start position so that the antenna direction is adjusted on the basis of the C/N level to provide received images of the optimum quality.

Further according to the present invention, in the fine adjustment mode, one or more peaks of the C/N level measured within the fine adjustment measuring range are detected, and it is judged whether the one or more peaks are those resulting from the reception of satellite broadcasting waves or not. When the C/N level exhibits only one peak resulting from the satellite broadcasting wave reception, the antenna direction is aligned with the direction corresponding to the peak. When the C/N level exhibits a plurality of peaks resulting from the satellite broadcasting wave reception, the antenna direction is aligned with the direction, of the directions corresponding to the peaks, closest to the fine adjustment start position.

DETAILED DESCRIPTION OF A PREFERRED EMBODIMENT

Figure 1:
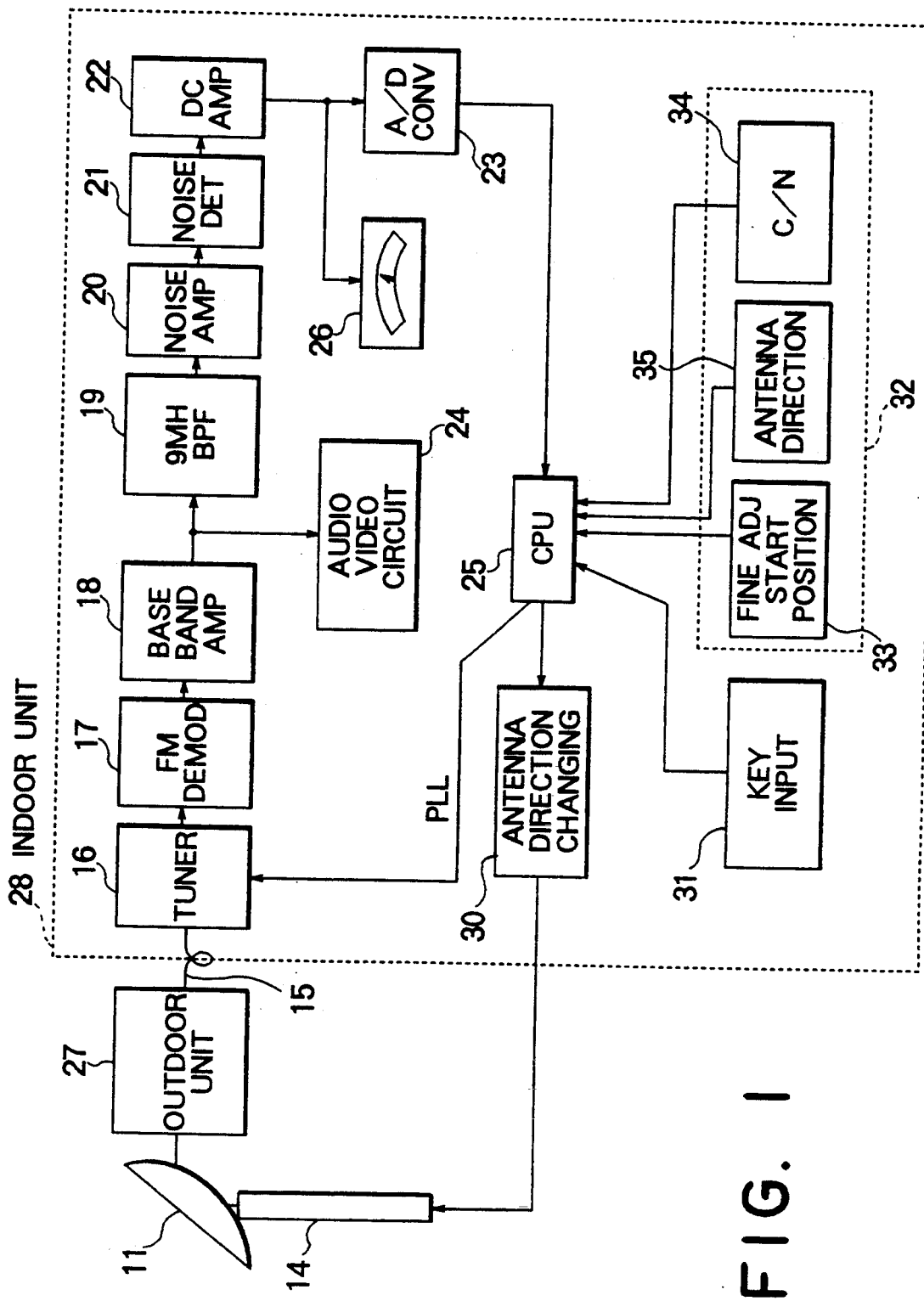
FIG. 1 is an illustration showing an embodiment of the present invention.

FIG. 1 represents a satellite broadcasting receiving system comprising an antenna direction adjusting apparatus in accordance with the present invention.

The reference numeral 11 indicates a parabolic antenna, whose steering angle is adjusted by an actuator 14; the length of the actuator 14 is controlled by the rotation of an internal DC motor (not shown).

On the other hand, a signal received by the antenna 11 enters an outdoor unit 27 and is then sent to a tuner 16 in an indoor unit 28 through a cable 15. The tuner 16 is supplied with a PLL (Phase Lock Loop) data based on the user's tuning operation by a CPU (Central Processing Unit) 25 and outputs the tuned broadcasting signal. This broadcasting signal is subjected to the FM demodulation by means of an FM demodulator 17 and subsequently amplified by a base band amplifier 18. The amplified signal is passed through an audio video circuit 24 to extract video and audio signals. The amplified signal is also input into a 9-MHz band-pass filter 19 to detect the noise component of 9 MHz.

Since the video frequency band ranges from DC to 4.2 MHz and the audio carrier frequency is in a range of 5 to 8.5 MHz, it is required to detect the noise of a frequency greater than 8.5 MHz in order to avoid the effect of modulated signals. On the other hand, the frequency region exceeding 10 MHz belongs to the adjoining channel. Therefore, a noise component of 9 MHz is preferably detected in this embodiment.

The detected noise component is amplified by a noise amplifier 20 and converted into a DC voltage by a noise detector 21. The DC voltage provided by the conversion is amplified by means of a DC amplifier 22 so as to vary in a range of 0 to 5 V according to the level variation of the input signal. Thereafter, the DC voltage is input into an A/D converter 23 to be converted into a digital signal. The digital signal value (the C/N level) exhibits a characteristic such that it decreases with a larger noise level and increases with the suppression of the noise due to the reception of the signal. Namely, the quality of images becomes higher as the C/N level increases.

The system exploits the characteristics that the FM demodulator 17 outputs stronger noises with no received signal but suppressed noises with received signals and the noise detector 21 outputs a lower DC voltage with stronger noises but a higher DC voltage with suppressed noises.

The adjustment of an antenna direction is conducted by a CPU (Central Processing Unit) 25, which acquires the C/N output by the A/D converter 23.

The satellite broadcasting receiving system operates in two modes, namely a mode for storing the programs broadcasted through a satellite and a mode for displaying the programs stored previously. If the image quality is not satisfactory during the displaying mode, the user may specify a fine adjustment mode by way of a key input portion 31.

In the storing mode, the CPU 25, on the instruction from the key input portion 31, controls an antenna direction changing device 30 to supply a ± voltage signal to a motor, thereby driving the actuator 14 to extend or withdraw for the variation of an antenna direction. The user may monitor a level meter 26 for displaying the C/N and interrupt the outputting of the ± voltage signal at the maximum deflection of the meter to cause the antenna to stop its motion. The CPU 25 stores the antenna direction at that moment into an antenna direction memory portion 35 in a memory 32.

In the case where a plurality of satellites exist, the above-described operation is repeated for the respective satellites to store the antenna direction for each satellite.

Now in the displaying mode for receiving the waves from a satellite, the user operates the key input portion 31 to make the antenna direction, stored previously in the storing mode mentioned above, be read out from the antenna direction memory portion 35, aligning an antenna direction with the read-out direction. If the image quality is not satisfactory, the user may further specify the fine adjustment mode through the key input portion 31 to automatically adjust the antenna direction for improved quality of the reproduced image.

Figure 2:
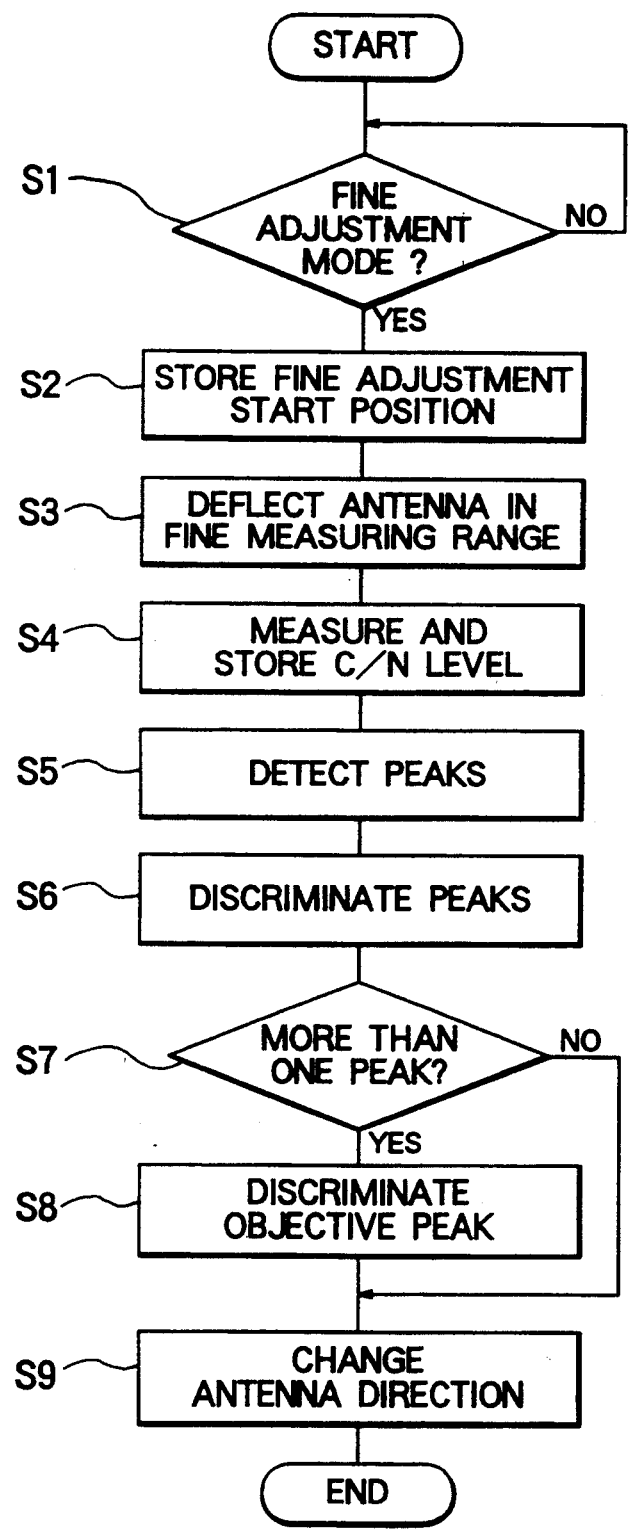
FIG. 2 is a flow chart showing the control performed by a CPU.

In the following, there will be described the operation of the system in the fine adjustment mode referring also to FIG. 2, which is a flow chart showing the operation of the CPU 25 in the fine adjustment mode.

Receiving the instruction specifying the fine adjustment mode from the key input portion 31 (step S1), the CPU 25 stores the current antenna direction P0, as the fine adjustment start position, into a memory portion 33 for the fine adjustment start position (step S2).

Subsequently, the CPU 25 controls the antenna direction changing device 30 to deflect the antenna to the right or left around the antenna direction P0, or the fine adjustment start position P0, within a predetermined range (termed a fine adjustment measuring range hereinafter) in the azimuthal direction in a stepwise manner with a very small angle $\Delta\theta$ for each step (step S3). During the deflection, the CPU 25 acquires the measured C/N level of the input signal from the A/D converter 23 and stores it into a C/N memory portion 34 in the memory 32 (step S4). On completion of the C/N level measurement through the entire fine adjustment measuring range, the CPU 25 detects the peaks of the C/N level within the measured range (step S5).

FIGS. 3 through 7 indicate a variety of waveforms of the C/N level, which respectively correspond to antenna directions with an incremental angle $\Delta\theta$.

Figure 3:
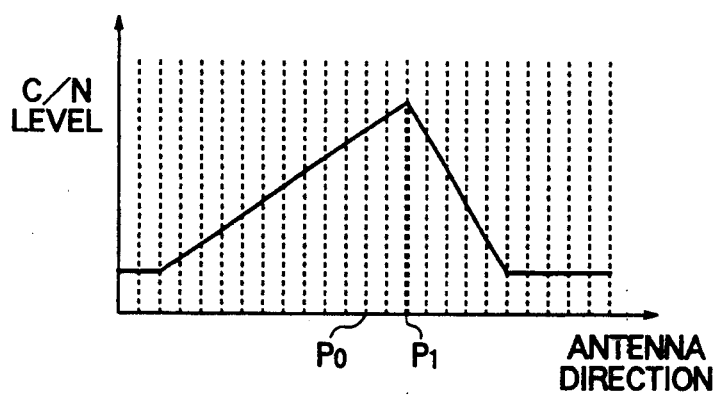
FIG. 3 is an illustration showing an example of a C/N level waveform.

The waveform of the C/N level in FIG. 3 is triangular, including one peak (at the antenna direction P1) within the fine adjustment measuring range.

Figure 4:
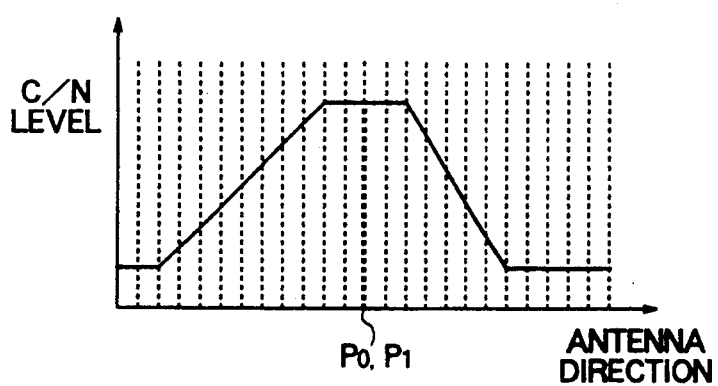
FIG. 4 is an illustration showing an example of a C/N level waveform.

The waveform of the C/N level in FIG. 4 involves a plurality of peaks of the same height, being trapezoidal. Such a trapezoidal waveform may appear owing to the directivity of the antenna, the characteristic of the noise detector 21, and/or the accuracy of the A/D converter 23. In this case, the CPU defines the center of the top flat portion of the waveform as the peak (at the antenna direction P1).

Figure 5:
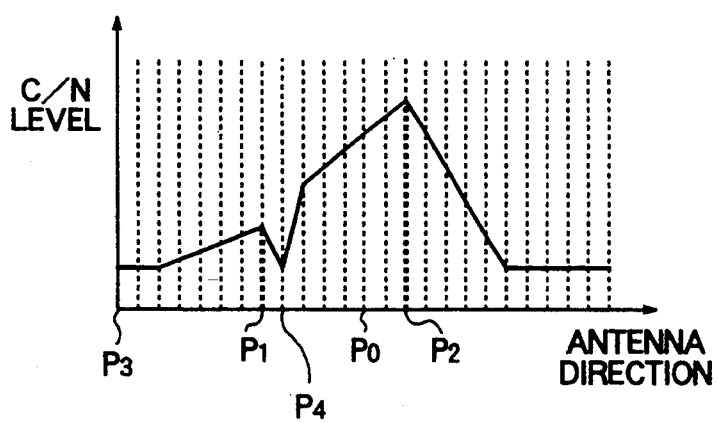
FIG. 5 is an illustration showing an example of a C/N level waveform.
Figure 6:
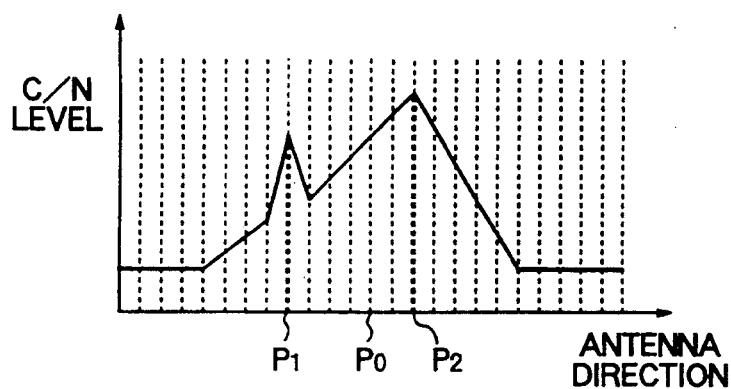
FIG. 6 is an illustration showing an example of a C/N level waveform.
Figure 7:
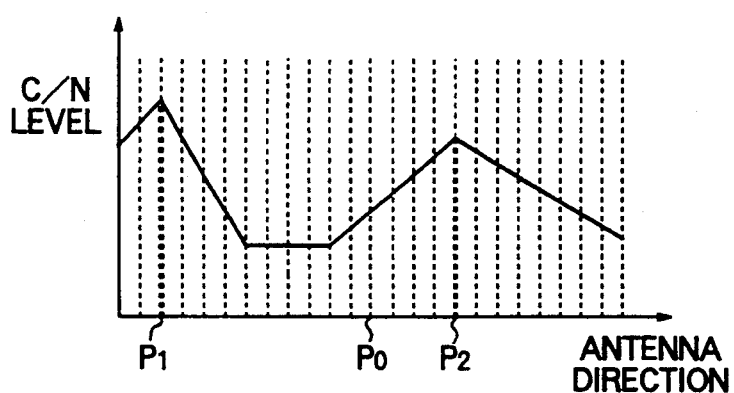
FIG. 7 is an illustration showing an example of a C/N level waveform.

The C/N level waveforms shown in FIGS. 5 through 7 include a plurality of peaks. For the simplicity of the description, waveforms with two peaks are shown in the respective illustrations. It is supposed here that the antenna directions corresponding to the peaks are respectively P1 and P2 and the antenna direction P2 is the objective.

The direction P1 for the peak in FIGS. 5 and 6 is the one resulting from an unintended operation of the antenna in the fine adjustment mode, such as a motion of the antenna due to wind and others, or the side lobe effect of the antenna. The CPU 25 judges whether the peak is the one caused by those reasons or not (step S6). This judgment is performed as follows. Referring to FIG. 5, the C/N level increases in the region from the antenna direction P3 to P1. In the region from the antenna direction P1 to P4, the C/N level decreases. In the region over the antenna direction P4, the C/N level increases again. In such a case, namely in the case where the C/N level once decreases and then increases again, if the decrease of the C/N level does not continue in a region exceeding $2 \times \Delta\theta$, the CPU judges that the preceding peak is a non-objective one caused by the unintended operation of the antenna or the side lobe effect. The CPU 25 recognizes such a peak to be not arising from the reception of the broadcasting wave and ignores it.

The peak of the C/N level waveform at the direction P1 in FIG. 6 is also judged as a non-objective one on the basis of the aforementioned judgment criterion.

In FIG. 7, the peak of the C/N level waveform at the direction P1, which is in the fine adjustment measuring range, corresponds to the signal received from an adjoining satellite. This peak is not judged to be non-objective in the peak judging step S6 mentioned above.

The CPU 25 judges whether more than, one peak corresponding to the signal reception exist or not based on the judgment in step S6 (step S7). When more than one peak exit, the CPU 25 judges the peak closest to the fine adjustment start position P0, the peak at the direction P2 in the case of FIG. 7, to be the objective peak (step S8). It should be noted that in this judgment the magnitude of the C/N level is not concerned.

In order to align the direction of the antenna 11 with the antenna direction P2 obtained in steps S6 and S8, the CPU 25 issues an instruction to the antenna direction changing device 30, thereby steering the antenna (step S9). This antenna direction provides the optimum quality of the images received.

In the embodiment as set forth above, in the case where the variation of the C/N level exhibits a decrease followed by an increase, the preceding peak is recognized to be non-objective if the decrease of the C/N level does not continue in a region exceeding $2 \times \Delta\theta$. However, such a judgment criterion is just an example and the invention should not be limited to this. For instance, the preceding peak may also be recognized to be non-objective if the decrease of the C/N level does not continue in a region exceeding $3 \times \Delta\theta$ in view of given conditions.

In the embodiment described above, it is supposed that the antenna direction is previously stored during the storing mode. However, if the user directly specifies the displaying mode skipping the storing mode, the user observes the level meter 26 displaying the C/N level and stops the antenna when the meter has reached a maximum deflection. With the thus obtained antenna direction being the fine adjustment start position, the above-described fine adjustment is performed when the user specifies the fine adjustment mode by operating the key input portion 31.

In accordance with the present is invention, the C/N level observed for the antenna direction adjustment. Therefore the effects of the signal losses within the cable interconnecting the outdoor unit and the indoor unit and the excessively amplified noises are eliminated. As a result, received images of improved quality can be provided as compared with the prior art where the AGC voltage is observed.

Moreover, in accordance with the present invention, when the signal from an adjoining satellite is received with the antenna direction in the fine adjustment measuring range during the fine adjustment mode, the antenna direction for the objective satellite is decided not by the magnitude of the peak of the C/N level but by the selection of the objective peak closest to the fine adjustment start position. Therefore, even if the signal from the adjoining satellite is stronger than the one from the objective satellite, the antenna is not steered toward the adjoining satellite.

The invention claimed is:

1. An antenna direction adjusting method for adjusting the direction of a parabolic antenna to provide images of an optimum quality in a system receiving satellite broadcasting waves directly, the method comprising the steps of:

adjusting the direction of the antenna on the basis of an index level showing a degree of suppression of noise, deflecting the antenna, in a fine adjustment mode, over a predetermined fine adjustment measuring range around a fine adjustment start position so as to adjust the antenna direction on the basis of said index level to provide received images of the optimum quality, detecting, in the fine adjustment mode, one or more peaks of the index level measured within said fine adjustment measuring range;

judging, in the fine adjustment mode, whether said one or more peaks are those resulting from the reception of satellite broadcasting waves or not;

aligning, in the fine adjustment mode, the antenna direction with the direction corresponding to one peak when said index level exhibits only said one peak resulting from the satellite broadcasting wave reception; and aligning, in the fine adjustment mode, the antenna direction with the direction, of the directions corresponding to a plurality of peaks, closest to said fine adjustment start position when said index level exhibits said plurality of peaks resulting from the satellite broadcasting wave reception.

2. An antenna direction adjusting apparatus for a system receiving satellite broadcasting waves directly, comprising:

a filter for detecting a noise component from the signal received by an antenna;

a noise detector for converting the detected noise component into a DC voltage;

a DC amplifier for amplifying said DC voltage;

an A/D converter for converting the amplified DC voltage into a digital signal indicative of an index level showing a degree of suppression of noise; and a control device for
  (a) adjusting an antenna direction on the basis of said index level,
  (b) deflecting, in a fine adjustment mode, the antenna over a predetermined fine adjustment measuring range around a fine adjustment start position so that the antenna direction is adjusted on the basis of said index level to provide received images of an optimum quality;
  (c) detecting, in said fine adjustment mode, one or more peaks of the index level measured within said fine adjustment measuring range;
  (d) judging, in a fine adjustment mode, whether said one or more peaks are those resulting from the reception of satellite broadcasting waves or not;
  (e) aligning, in a fine adjustment mode, the antenna direction with the direction corresponding to one peak when said index level exhibits only said one peak resulting from the satellite broadcasting wave reception; and
  (f) aligning, in a fine adjustment mode, the antenna direction with the direction, of the directions corresponding to a plurality of peaks, closest to said fine adjustment start position when said index level exhibits said plurality of peaks resulting from the satellite broadcasting wave reception.

3. An antenna direction adjusting method according to claim 1, wherein the degree of suppression noise index is a carrier-to-noise ratio (C/N).

4. An antenna direction adjusting apparatus according to claim 2, wherein the degree of suppression of noise index is a carrier-to-noise ratio (C/N).

* * * * *